United States Patent [19]
Gobetz

[11] 3,782,752
[45] Jan. 1, 1974

[54] MULTI-PURPOSE CART

[76] Inventor: Giles Edward Gobetz, 29227 Eddy Rd., Wickliffe, Ohio 44092

[22] Filed: Apr. 3, 1972

[21] Appl. No.: 240,679

[52] U.S. Cl....... 280/47.19, 280/47.26, 280/DIG. 3, D14/3 S
[51] Int. Cl............................................. B62b 1/10
[58] Field of Search...................... 280/47.26, 47.24, 280/47.19, 47.17, DIG. 3, DIG. 4; 248/98, 129; D14/3 S, 3 M

[56] References Cited
UNITED STATES PATENTS

| 2,570,504 | 10/1951 | Van House | 280/47.19 |
| D157,589 | 3/1950 | Hartenbach | 280/47.24 X |
| 2,415,334 | 2/1947 | Brown | 280/47.26 |
| 2,504,907 | 4/1950 | Truran | 280/47.18 X |
| 3,188,109 | 6/1965 | Broadrick | 280/47.26 |
| 3,603,542 | 9/1971 | Grille | 248/129 |

FOREIGN PATENTS OR APPLICATIONS

| 1,077,765 | 11/1954 | France | 280/47.18 |
| 1,175,963 | 1/1970 | Great Britain | 248/98 |

*Primary Examiner*—Kenneth H. Betts
*Assistant Examiner*—John A. Pekar
*Attorney*—Harlan E. Hummer

[57] ABSTRACT

A cart mounted on wheels and having a basic frame on which a variety of attachments may be detachably mounted.

13 Claims, 5 Drawing Figures

PATENTED JAN 1 1974
3,782,752
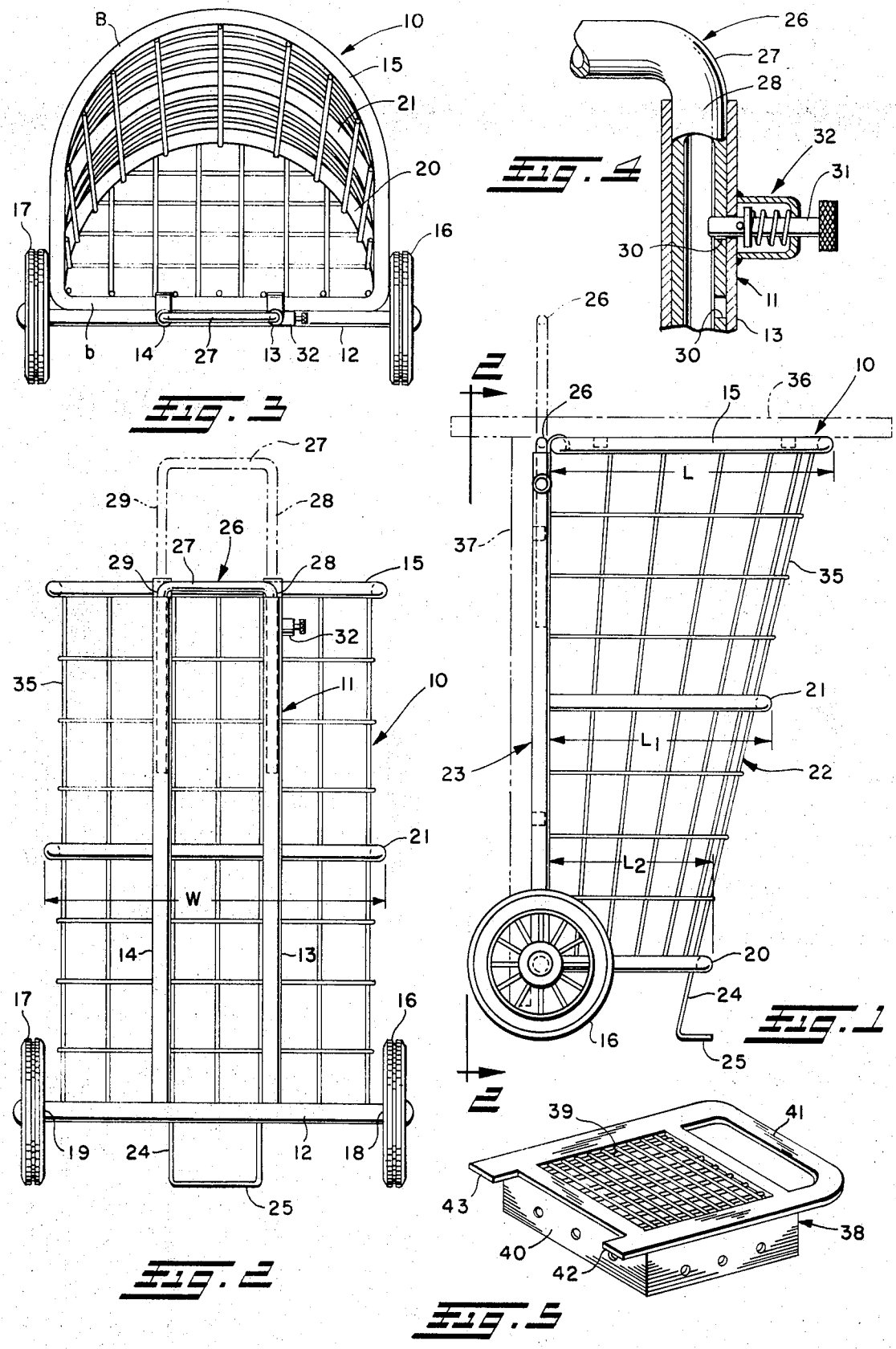

3,782,752

MULTI-PURPOSE CART

BACKGROUND OF INVENTION

This is an age of convenience. Modern man has developed many work saving techniques and devices to free himself from the shackles and drudgery of hard physical labor, so that he might have more time to fully develope his talents and enjoy other pursuits more to his liking, such as hobbies or recreation. A close look at our society in the United States of America reveals a nation literally on wheels. Everything is being made portable to accommodate a life style reflecting this new freedom of movement. Wheeled devices are used for supporting everything imaginable.

The use of wheeled carts in our stores has made shopping a delightful experience. In fact, such carts have become a necessity in certain establishments where the merchandise is presented for self-service by the shopper. The gourmet is no longer confined to a hot, sweaty kitchen, but with a portable grille, on wheels, can enjoy preparing gastronomical delights in the spacious outdoors where odors and flavors seem most poignant. Gardening is simplified by using specially designed wheelbarrow-like carts for hauling grass cuttings, dirt, and other material needing transporting from one place to another. These are a few examples of the various carts in use today.

Many of the wheeled devices presently on the market, however, are designed for specific purposes and are not readily adapted for different uses. This is attested by U.S. Pats. Nos. 2,181,892; 2,798,651; 2,840,142; 2,842,373; 3,008,463; 3,353,836; and 3,418,008 which show and describe uniquely designed carts. It can be appreciated from a study of these patents that the framework of each cart is special and suitable only for the purpose for which the cart is intended. The invention is directed to providing a wheeled cart which is readily adapted for performing a number of different functions.

Briefly stated, the invention is in a multi-purpose cart suitable for many different uses. The cart essentially comprises an elongated axle on which a pair of wheels are mounted in spaced relation for rotation about the longitudinal axis of the axle. At least one pair of parallel uprights extend from the axle at right angles to the longitudinal axis of the axle and at least one rim extends from the uprights in spaced relation from the axle. The rim lies in a plane which is angularly disposed to the longitudinal axis of the uprights and is designed for receiving and supporting a plurality of attachments which are detachably mounted on the cart. A handle for pulling or pushing the cart is also mounted on the uprights.

DESCRIPTION OF THE DRAWING

The following description of the invention will be better understood by having reference to the annexed drawing, wherein:

FIG. 1 is a side view of a cart made in accordance with the invention;

FIG. 2 is the cart viewed from the line 2—2 of FIG. 1;

FIG. 3 is a top view of the cart;

FIG. 4 is an enlarged detailed section of a latching mechanism used for holding the handle of the cart in a number of positions relative to the uprights; and FIG. 5 is a perspective view of an outdoor barbecue grille attachment.

DESCRIPTION OF THE INVENTION

Referring more particularly to FIGS. 1–3 of the drawing, there is shown a multi-purpose cart, generally indicated at 10. The cart 10 has a basic framework 11 essentially comprising: an elongated axle 12, a pair of uprights 13 and 14 extending from the axle 12; and at least one rim 15 extending from the uprights 13 and 14 in spaced relation from the axle 12. The framework 11 is conveniently formed of light weight tubular members composed of any suitable material, e.g., a non-corrosive chrome plated metal. The uprights 13 and 14 are perferably parallel and have longitudinal axes which are normal to the longitudinal axis of the axle 12. The upper rim 15 is desirably continuous and welded to the uprights 13 and 14 such that the plane of the upper rim 15 is normal to the longitudinal axes of the uprights 13 and 14.

A pair of wheels 16 and 17 are mounted on opposing ends 18 and 19 of the axle 12 for rotation about the longitudinal axis of the axle 12. A base 20 is provided and conveniently extends from the axle 12 in a plane parallel to the plane of the upper rim 15. The base 20 may be a solid plate, or a tubular frame with wire screening filling the space bounded by the tubular frame.

A second rim 21 is supplied intermediate the base 20 and upper rim 15, and preferably extends from the uprights 13 and 14 in parallel relation to the upper rim 15. The intermediate rim 21 is also continuous and, like the upper rim 15, is composed of any satisfactory metal tubing sufficient to support the weight of different attachments mountable on the rims 15 and 21.

The upper rim 15, the intermediate rim 21, and the lower base 20 have similar widths W, but extend from the uprights 13 and 14 in decreasing lengths L, $L_1$, and $L_2$ respectively, such that the general outline or front 22 of the cart 10 has an angular appearance in relation to the horizontal when the back 23 of the cart 10 is vertically disposed. The base 20 and rims 15 and 21 are each formed from a semi-circular bar B which is integral with a straight bar b adjacent the uprights 13 and 14.

A leg 24 extends from the base 20 and is provided for maintaining the uprights 13 and 14 in a vertical position when the wheels 16 and 17 of the cart 10 are resting on a horizontal surface. The leg 24 has an outturned foot 25 designed for resting on a surface on which the wheels 16 and 17 rest.

A handle 26 is mounted on the uprights 13 and 14. The handle 26 is generally U-shaped having a cross bar 27 with outstanding arms 28 and 29 which are slidably mounted on the uprights 13 and 14. The handle 26 is also tubular having an outside diameter which is slightly less than the inside diameter of the tubular uprights 13 and 14. The arms 28 and 29 (FIG. 4) are each provided with a number of axially spaced openings 30 for receiving a spring biased pin 31 of a latching mechanism 32 carried by one or each of the uprights 13 and 14 for holding the handle 26 in a fully retracted position (FIG. 4) and a number of extended positions relative to the uprights 13 and 14, e.g., the fully extended position of the handle 26 as shown in dotted line in FIGS. 1 and 2. The handle 26 is extensible relative to, and in the plane of, the uprights 13 and 14.

The basic framework of the cart 10 is designed for receiving a number of attachments. For example, a specially configured wire cage 35 is insertible between the upper and intermediate rims 15 and 21 for resting on the lower base 20. The wire cage 35 has an opening adjacent the upper rim 15 through which material is placed into the wire cage 35. The upper rim 15 may be provided with standard snap-on fasteners for locking engagement with mating fasteners on canvas bags of varying depths, when it is desirable to have a more solid type container, rather than the more open wire cage 35.

A table top 36 with conventional spring steel clips may be detachably mounted on the upper rim 15 to provide a roll-about picnic table. A decorative panel 37 with similar clips may be detachably mounted on the uprights 13 and 14 when, for example, it is desirable to use the cart 10 as a portable bar. In such cases, it may be advantageous to extend the handle 26 and panel 37 above a semi-circular table top 36 abutting the bar front panel 37. A smaller liquid impervious bag for holding ice or pop can be detachably mounted on the intermediate rim 21, when the cart 10 is made into a portable bar. This particular arrangement could also be used as a portable rostrum or speaker's lectern.

The cart 10 may be converted into a portable toy chest by using a front panel 37 resembling a popular cartoon character or animal, e.g., a snow man or Santa Claus.

A baby-seat, composed of any satisfactory flexible material, may be attached to the intermediate rim 21 to provide a baby stroller. A barbecue grille 38 (FIG. 5) including a wire grate 39 supported on a ventilated hot box 40 with a handle 41 and projecting lugs 42 and 43 for resting on the upper rim 15, may be made portable by mounting on the cart 10. A tray may be placed on the intermediate rim 21 for supporting the food to be cooked. These are but a few of the many attachments which may be removably positioned on the basic framework of the cart 10. The framework, as indicated, is made from light weight metal tubing preferably having an outside diameter of from ½ to 1½ inches depending on the size of the cart 10.

Thus, there has been provided a multi-purpose cart having a framework designed for supporting a number of attachments which may be detachably mounted on the cart.

I claim:
1. A multi-purpose cart, comprising:
   a. an elongated axle;
   b. a pair of wheels mounted in spaced relation of the axle for rotation about the longitudinal axis of the axle;
   c. at least one pair of uprights extending from the axle, the uprights being parallel and disposed at right angles to the longitudinal axis of the axle;
   d. at least one continuous rim extending from the uprights in spaced relation from the axle, the rim lying in a plane normal to the longitudinal axes of the uprights, and designed for holding a plurality of attachments mounted on the cart;
   e. a base extending from the uprights adjacent the axle in parallel relation with the rim;
   f. a leg extending from the base for supporting the car in a position where the uprights are vertical when the wheels and leg are resting on a horizontal surface;
   g. a handle for pushing or pulling the cart; and
   h. means for detachably mounting the handle on the uprights including i) means for slidably mounting the handle on the uprights such that the handle is extensible from, and in the same plane as, the uprights, and ii) means for holding the handle in a plurality of extended positions relative to the uprights including holding the handle in a position where the top of the handle, measured vertically from the axle, is not above the upper rim.

2. The cart of claim 1, which includes a container disposable within the rim.

3. The cart of claim 2, wherein the container is an open mesh wire container supportable on the base.

4. The cart of claim 1, which includes a second rim extending from the uprights intermediate the base and other rim in parallel relation to the other rim.

5. The cart of claim 1, which includes a plurality of attachments, and means for removably mounting the attachments on the rim.

6. A multi-purpose cart, comprising:
   a. an elongated axle;
   b. a pair of wheels mounted on opposing ends of the axle for rotation about the longitudinal axis of the axle;
   c. a pair of uprights extending from the axle in parallel relation, the uprights having longitudinal axes normal to the longitudinal axis of the axle;
   d. an upper rim extending from the uprights in spaced relation from the axle, the rim being continuous and in a plane normal to the longitudinal axes of the uprights;
   e. a base extending from the uprights adjacent the axle in parallel relation with the upper rim;
   f. an intermediate rim extending from the uprights between the base and upper rim, the intermediate rim being continuous and lying in a plane parallel to the plane of the upper rim, each of the rims including a straight rim portion adjacent the uprights and a curved rim portion extending from the straight rim portion;
   g. a leg extending from the base and coacting with the wheels for supporting the uprignts in a vertical position when the wheels and leg are resting on a horizontal surface;
   h. a generally U-shaped handle including a cross bar and outstanding pair of arms which are slidably mounted on the uprights and extensible therefrom and in the same plane as the uprights;
   i. means for maintaining the handle in a plurality of extended positions relative to the uprights; and
   j. a wire cage at least partially co-extensive with the uprights and disposable within the rims.

7. The cart of claim 6, which includes a table top, and means for removably mounting the table top on the upper rim.

8. The cart of claim 6, which includes a grille having a grate and a box for holding charcoal or the like, and means for removably mounting the grille on the upper rim.

9. The cart of claim 6, which includes a plurality of attachments and means for removably mounting the attachments on the upper rim.

10. The cart of claim 6, which includes a decorative panel, and means for removably mounting the panel on the uprights.

11. the cart of claim 9, wherein the attachments include a flexible container for detachably mounting on either of the rims.

12. The cart of claim 6, wherein the rims are metal tubes composed of non-corrosive metal.

13. The cart of claim 12, wherein the uprights and handle are also metal tubes and the outside diameter of the tubular handle is slightly smaller than the inside diameter of the tubular uprights, such that the tubular handle is slidably received within the tubular uprights.

* * * * *